US011209007B2

(12) United States Patent
Rosca et al.

(10) Patent No.: US 11,209,007 B2
(45) Date of Patent: Dec. 28, 2021

(54) CONVERTING MECHANICAL ENERGY FROM VIBRATION INTO ELECTRICAL ENERGY TO POWER A CIRCUIT BOARD FOR CONDITION MONITORING OF ROTATING MACHINERY (71) Applicant: FLUID HANDLING LLC., Morton Grove, IL (US)

(72) Inventors: Florin Rosca, Niles, IL (US); Indresh Ishwarlal Bhatia, Gujarat (IN); James Jin-hau Gu, Buffalo Grove, IL (US); Naman Maheshkumar Raval, Gujarat (IN)

(73) Assignee: FLUID HANDLING LLC, Morton Grove, IL (US)

( * ) Notice: Subject to any disclaimer, the term of this patent is extended or adjusted under 35 U.S.C. 154(b) by 579 days.

(21) Appl. No.: 16/141,210

(22) Filed: Sep. 25, 2018

(65) Prior Publication Data
US 2019/0136861 A1 May 9, 2019

Related U.S. Application Data (60) Provisional application No. 62/562,752, filed on Sep. 25, 2017.

(51) Int. Cl.
*H02N 2/18* (2006.01)
*F04D 27/00* (2006.01)
(Continued)

(52) U.S. Cl.
CPC .......... *F04D 27/001* (2013.01); *G01H 1/003* (2013.01); *G01L 1/16* (2013.01); *H02K 7/14* (2013.01);
(Continued)

(58) Field of Classification Search
CPC ...... H02N 2/181; H02N 2/186; F04D 27/001; G01H 1/003; H02K 7/14; H02K 7/18; H02K 11/20; H02K 11/25; G01L 1/16
See application file for complete search history.

(56) References Cited

U.S. PATENT DOCUMENTS 6,747,572 B2 6/2004 Bocko et al.
6,954,025 B2 10/2005 Nishida et al.
(Continued)

FOREIGN PATENT DOCUMENTS

EP 2415619 A1 2/2012
KR 101588713 B1 1/2016
(Continued)

OTHER PUBLICATIONS

English language Abstract of KR101588713.
(Continued)

*Primary Examiner* — J. San Martin
(74) *Attorney, Agent, or Firm* — Ware, Fressola, Maguire & Barber LLP (57) ABSTRACT A system includes power harvesting circuitry in combination with energy storage and conversion circuitry. The power harvesting circuitry may be configured to respond to energy generated by rotary machinery having at least condition being monitored by at least one component having at least one electronic circuit, and provide harvested power. The energy storage and conversion circuitry may be configured to respond to the harvested power provided from the power harvesting circuitry, and provide stored and converted power to the at least one component for monitoring the least one condition of the rotary machinery.

21 Claims, 3 Drawing Sheets

A System (51) Int. Cl.
*H02K 11/25* (2016.01)
*G01L 1/16* (2006.01)
*H02K 7/18* (2006.01)
*H02K 11/20* (2016.01)
*H02K 7/14* (2006.01)
*G01H 1/00* (2006.01)

(52) U.S. Cl.
CPC .............. *H02K 7/18* (2013.01); *H02K 11/20* (2016.01); *H02K 11/25* (2016.01); *H02N 2/181* (2013.01); *H02N 2/186* (2013.01)

(56) References Cited

U.S. PATENT DOCUMENTS

| | | | |
|---|---|---|---|
| 6,995,496 | B1 | 2/2006 | Hagood, IV et al. |
| 7,256,505 | B2 | 8/2007 | Arms et al. |
| 7,719,416 | B2 | 5/2010 | Arms et al. |
| 7,812,466 | B2 | 10/2010 | Lu et al. |
| 7,893,599 | B2 | 2/2011 | Morris et al. |
| 7,952,349 | B2 * | 5/2011 | Huang .................. H02K 99/10 324/249 |
| 8,036,847 | B2 | 10/2011 | Discenzo |
| 8,618,934 | B2 | 12/2013 | Belov et al. |
| 8,922,097 | B2 | 12/2014 | Vijayakumar |
| 8,979,505 | B2 | 3/2015 | Pessin et al. |
| 8,987,924 | B2 | 3/2015 | Estes |
| 9,294,014 | B2 | 3/2016 | Near |
| 9,647,578 | B2 | 5/2017 | Delamare et al. |
| 9,701,325 | B2 | 7/2017 | Kim et al. |
| 9,729,087 | B2 | 8/2017 | Katsumura et al. |
| 9,748,872 | B2 | 8/2017 | Al Ahmad et al. |
| 9,762,150 | B2 | 9/2017 | Ludlow et al. |
| 2003/0146676 | A1 * | 8/2003 | Mancosu .................. H02N 2/18 310/339 |
| 2005/0017602 | A1 | 1/2005 | Arms et al. |
| 2007/0257766 | A1 | 11/2007 | Richards et al. |
| 2008/0252174 | A1 | 10/2008 | Mohammadi et al. |
| 2011/0248846 | A1 * | 10/2011 | Belov .................. H04Q 9/00 340/539.1 |
| 2011/0278986 | A1 | 11/2011 | Campbell |
| 2013/0299000 | A1 | 11/2013 | Gillette, II |
| 2014/0182378 | A1 | 7/2014 | Loverich et al. |
| 2015/0311824 | A1 | 10/2015 | Eltamaly et al. |
| 2016/0126868 | A1 | 5/2016 | Erturk et al. |
| 2016/0233797 | A1 | 8/2016 | Lajnef et al. |
| 2017/0310345 | A1 | 10/2017 | Kitayoshi et al. |

FOREIGN PATENT DOCUMENTS

| | | |
|---|---|---|
| WO | 2004010096 A1 | 1/2004 |
| WO | 2017009660 A1 | 1/2017 |
| WO | 2017041294 A1 | 3/2017 |
| WO | 2017070187 A1 | 4/2017 |
| WO | 2017117247 A1 | 7/2017 |

OTHER PUBLICATIONS

Ibrahim, Rosdiazli, and Mohd Haris Md Khir, "A case study for industrial centrifugal pump as a vibration source for macro-scale electromagnetic energy harvesting," Intelligent and Advanced Systems (ICIAS), 2016 6th International Conference on. IEEE, 2016. http://ieeexplore.ieee.org/document/7824040/.

"Pump monitoring with Wilcoxon piezoelectric accelerometers assures reliable measurements," Wilson Research, wilcoxon.com, accessed, Sep. 2017. https://wilcoxon.com/wp-content/uploads/2016/07/PT103-Pump-vibration-monitoring-1.pdf.

Sardini, Emilio, and Mauro Serpelloni, "Passive and self-powered autonomous sensors for remote measurements," Sensors 9.2, 2009, pp. 943-960. www.mdpi.com/1424-8220/9/2/943/pdf.

"Home," Kinergizer, kinergizer.com, accessed, Sep. 2017. http://kinergizer.com/.

"Vibration Energy Harvesting," ReVibe Energy, revibeenergy.com, Feb. 2, 2017. https://web.archive.org/web/20170202150940/http://revibeenergy.com:80/vibrationenergyharvesting.

Aloulou, Rahma, et al., "A power management system for energy harvesting and wireless sensor networks application based on a novel charge pump circuit," International Journal of Electronics 103.5, 2016, pp. 841-852. http://www.tandfonline.com/doi/abs/10.1080/00207217.2015.1072848?journalCode=tetn20.

\* cited by examiner

FIG. 1
(PRIOR ART)

FIG. 2: A Condition Monitoring Device

FIG. 3: A System

CONVERTING MECHANICAL ENERGY FROM VIBRATION INTO ELECTRICAL ENERGY TO POWER A CIRCUIT BOARD FOR CONDITION MONITORING OF ROTATING MACHINERY

CROSS-REFERENCE TO RELATED APPLICATION

This application claims benefit to provisional patent application Ser. No. 62/562,752, filed 25 Sep. 2017, which is hereby incorporated by reference in its entirety.

BACKGROUND OF THE INVENTION

1. Field of the Invention

The present invention relates to a technique for monitoring conditions of rotary machinery.

2. Brief Description of Related Art

Healthy operation of a system is one of the most important criteria for any equipment, e.g., including equipment like rotary machinery such as a pump and its applications. Ensuring this healthy running condition of the system is becoming an important requirement in the present market conditions. There is a huge loss of production, thus leading to substantial costs, in the event of unplanned stoppages due to component failures. Condition monitoring thus proves a very important role in managing these kinds of situations.

Condition monitoring is a subject that involves measurement of important values of the pump running conditions and recording them at regular intervals. The goal is to recognize any possible damage early enough so that a faulty machine part can be repaired or replaced before it leads to consequential damage or a partial or complete breakdown of the system.

By way of example, the specific purpose of condition monitoring is to collect and process sensor data (e.g. vibrations, temperatures, pressures, flows) that can be used to assess the overall condition of the system. Deviations from normal values are caused by defects, which can occur for a variety of reasons. If corresponding countermeasures are not taken, this can quickly lead to a malfunction and breakdown of the system. Monitoring the sources of defects through the analysis of machine parameters (e.g., sensor data) can make it possible to recognize malfunctions as early as possible in order to take preventive action. Possible responses can include, for example, an error message or warning to the operator or an automated action for fault clearance and prevention of damage all the way up to automatic shutdown.

The integration and systematic implementation of condition monitoring provides many advantages like:

1) System components are only repaired or replaced when actually necessary. Potential defects are recognized early on in operation.
2) Reliability can be significantly increased by integrating condition monitoring into the process.

One of the modules in the condition monitoring system is vibration monitoring which measures the vibrations (e.g., 1—axis, 2—axis, or 3—axis) of the pumps at different positions and indicates the health of that particular position.

This vibration monitoring module (or any other parameter monitoring module) is built up using the required sensor and the corresponding electronic hardware (and firmware/software) which can sense the output of the sensor, scale it with analog electronics hardware, process the signals to be interfaced with a micro controller/microprocessor, and communicate the output by any means—such as simple LED indication or a wired/wireless communication interface.

Figure 1:
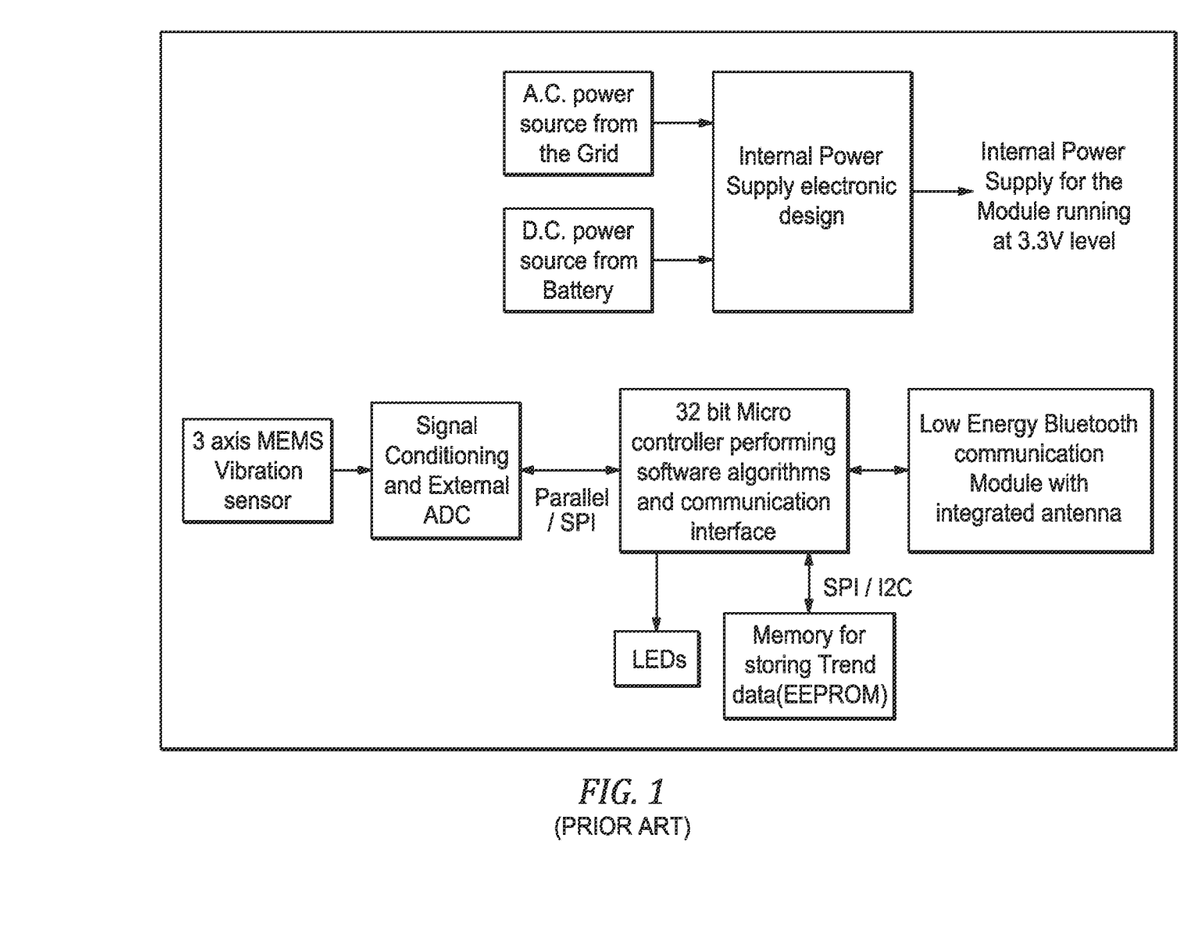
FIG. 1 is a block diagram of a condition monitoring device that is known in the art.

By way of example, FIG. 1 shows a possible design for such a module, e.g., that includes a 3 axis microelectromechanical systems (MEMS) vibration sensor, a signal conditioning and external ADC (coupled via a parallel/SPI interface), a 32-bit micro controller performing software algorithms and communications interface (e.g., with LEDs and a memory for storing trend data (EEPROM) coupled via a SPI/I2C interface), a low energy Bluetooth communication module with an integrated antenna.

Shortcomings of the Prior Art Design

In order to realize the solution described above, a power supply is needed to power up the electronics hardware. By way of example, the power supply in FIG. 1 may include, or take the form of, an internal power supply electronic design and an AC power source from the grid and/or a DC power source, e.g., from a battery, which is configured to provide an internal power supply for the condition monitoring module running at a 3.3 V level. This could be an AC-DC/DC-DC converter, or SMPS, or similar power supply designs, which are dependent on the power from the grid or a big battery, depending on the power supply design.

In any case, a strong cable connection with the respective connectors on both ends—from the Grid power supply outlet or the Battery input to the Condition Monitoring Module—is needed.

Moreover, in a water pump application, the design also has to meet the required ingress protection (IP) standards along with all the compliance standards requirements.

This external cable connection adds up to the cost of the solution and may also impact reliability of the complete solution over a long period of time and becomes one of the possible candidates for periodic maintenance. Additionally, it adds the dependency on external power supply for condition monitoring purpose.

An alternative way of powering up the electronics could be to use the low voltage batteries, which seems to be an attractive solution. Batteries are easy to buy, are cheap, but changing/replacing the batteries is not so cheap, and has a lot of hidden costs behind it.

However, a battery-based solution has its own limitations in terms of having limited operating life of the battery and thus the need for periodic replacement of the battery.

Moreover, in order to implement the battery-based solution, battery voltage monitoring circuits are needed, e.g., for monitoring the battery health, for providing alarms to the user about need to replace the battery, etc., which becomes an indirect requirement to the user compared to the direct requirement of the pump condition monitoring.

Moreover still, the storage of batteries needs high standards and is a real challenge. Improperly stored batteries—stacked one on top of other—can burst or generate heat.

Further, batteries contain heavy metals such as mercury, lead, cadmium, nickel etc., which pose adverse impacts to the environment. At the time of replacement, the dead battery needs to be carefully disposed by the manufacturer or user due to the toxic/flammability risks they pose.

Also, the battery life is temperature dependent. In general, there will be an increase in the battery life at lower temperatures, and decrease in battery life at higher temperatures. So, this adds another factor for a battery based application.

Apart from these environmental and logistics issues, there are also functional limitations for a battery based system. In order to guarantee a defined life time of the battery based product, one needs to specify more on the usage criteria for the product. For example, i-Alert2 condition monitoring device manufactured by ITT, which is a battery-based vibration monitoring product, specifies that the battery life is accounted for 3 years under the following conditions:

1) Temperature: 18° C. (65° F.), average ambient,
2) Dashboard connections (including trend download) of once per day,
3) Fast Fourier Transform (FFT) and Time Waveform usage of one tri-axial request per 14 days, and
4) Operation time in Alarm at most 25% of total time.

(See: https://www.ittproservices.com/ittgp/medialibrary/IT-TPROServices/website/Aftermarket%20Products/Monitoring%20Solutions/i-Alert/Certifications/General-_FAQ_i-ALERT2_Equipment_Health_Monitor.pdf.)

This proves to be a limitation in the basic functionality expected from the product itself. However, this is true from a technical perspective, since the electronics shall draw the power from the battery, as long as it is kept powered ON. The higher the frequency of powering ON and higher the time for which the condition monitoring device stays ON shall reduce the battery life/drain the battery proportionally.

In view of this, there is a need in the pump industry for a better way to power a condition monitoring device for monitoring conditions of rotary machinery, e.g., like a pump.

SUMMARY OF THE INVENTION

In summary, to overcome the limitations of the prior art mentioned above, a condition monitoring device according to the present invention may be configured so as to be a self-powered system or device, e.g., that does not depend on any external power source and is able to generate the power for itself from any of the respective condition sensing elements to which it is attached or forms part of.

A battery-less solution which also does not have any dependency on the external power supply for operations provides a huge competitive advantage in today's market.

This battery-less solution also provides a very useful application where the lifetime of the product is very large and battery based solution is not an option.

Some of the commonly available condition monitoring signals in any equipment, e.g., like vibrations, temperature, 4-20 mA, etc., are typically available for sensing, or used for the basic operation of the equipment itself. By way of example, one or more power harvesters may be configured in relation to one or more of these condition monitoring sources or devices, e.g., consistent with that set forth herein.

By way of example, and according to some embodiments of the present invention, power may be harvested from the one or more condition monitoring sources or devices configured for sensing the corresponding condition monitoring signals, and eliminate the need of external power supply/battery for the operation/interfacing of these signals (which in normal cases is required).

One can also combine the power harvested from different sensing sources and make a single harvesting node, and then distribute the generated power to the different electronic units which are required for the interfacing/using these sensors.

In cases where an end customer wants a back-up power (e.g., a battery), then the battery power can also be combine in this approach using a so-called hybrid approach, e.g., as another power source, and can be programmed so that a load powered by a battery may be diverted only in case the end-equipment is not powered ON. During the running condition of the end-equipment, the load may still be supplied by the power harvested sources, thus extending the operating life of the battery, and limiting the effects of the shortcomings of using the batteries.

By way of example, this can be technically achieved by keeping the power harvested voltage level slightly above the battery voltage and combining the 2 nodes with a diode, so the power may be drawn from the harvested node, and not the battery. Only when the voltage level from the power harvested node is less than the battery, will the power from the battery is drawn, thus extending the life of battery.

Specific Embodiments

According to some embodiments, the present invention may take the form of a system featuring power harvesting circuitry in combination with energy storage and conversion circuitry.

The power harvesting circuitry may be configured to respond to energy generated by rotary machinery having at least condition being monitored by at least one component having at least one electronic circuit, and provide harvested power.

The energy storage and conversion circuitry may be configured to respond to the harvested power provided from the power harvesting circuitry, and provide stored and converted power to the at least one component for monitoring the least one condition of the rotary machinery.

The system may also include one or more of the following features:

The power harvesting circuitry may include at least one piezoelectric sensor configured to respond to mechanical energy from a vibration generated in one or more axes by the rotary machinery, and provide the harvested power as electrical energy.

The electrical energy may include AC electrical energy; and the energy storage and conversion circuitry may include an input energy storage buffer capacitor configured to respond to the AC electrical energy, and provide stored input AC electrical energy for AC/DC energy conversion.

The energy storage and conversion circuitry may include AC/DC converter circuitry configured to respond to the stored input AC electrical energy and provide DC electrical energy.

The energy storage and conversion circuitry may include DC/DC converter circuitry configured to respond to the DC electrical energy and provide converted DC/DC electrical energy at a designed DC voltage to power the at least one component.

The energy storage and conversion circuitry may include an output energy storage buffer capacitor configured to respond to the converted DC/DC electrical energy, and provide stored converted DC/DC electrical energy to power the at least one component.

The system may include a switch arranged between the output energy storage buffer capacitor of the energy storage and conversion circuitry and the at least one component, configured to remain in an ON condition until the stored and converted power has a voltage that is less than a predefined threshold voltage of the at least one component, and configured to remain in an OFF condition after the voltage stored in the output energy storage buffer capacitor rises above the predefined threshold voltage of the at least one component.

The at least one piezoelectric sensor may include multiple piezoelectric sensors stacked together.

The power harvesting circuitry may be configured to couple mechanically to the rotary machinery.

The system may be a self-power monitoring system having at least one component for monitoring at least one condition of the rotary machinery.

The at least one piezoelectric sensor may be configured to respond to mechanical vibration produced by the rotary machinery and provide a piezoelectric sensor electrical signal containing information about the amplitude of mechanical vibrations sensed.

The rotary equipment may be a pump. The system may include, or take the form of, the pump.

The power harvesting circuitry may be configured to respond to energy generated by the rotary machinery, e.g., that may include signals or signaling related to sensing vibration or temperature.

The at least one component may include a sensor, or a controller, or a wired or wireless data communication device, or some combination thereof, e.g., that form part of a condition monitoring device.

The system may include a condition monitoring device having the at least one component with the at least one electronic component.

A Condition Monitoring System

According to some embodiments, the present invention may include, or take the form of, a condition monitoring system for monitoring at least one condition of rotary machinery that features at least one piezoelectric sensor and energy storage and AC/DC conversion circuitry. The at least one piezoelectric sensor may be configured to respond to mechanical energy generated by rotary machinery having at least condition being monitored by at least one component having at least one electronic circuit, and provide AC electrical energy. The energy storage and AC/DC conversion circuitry may be configured to respond to the AC electrical energy, and provide DC electrical energy to power the at least one component for monitoring of the rotary machinery.

The energy storage and AC/DC conversion circuitry may include an input energy storage buffer and an AC/DC bridge rectifier circuit. The input energy storage buffer may be configured to respond to the AC electrical energy, store the AC electrical energy, and provide stored input AC electrical energy. The AC/DC bridge rectifier circuit may be configured to respond to the stored input AC electrical energy and provide converted AC/DC electrical energy power to the at least one component for monitoring the rotary machinery.

The energy storage buffer may include an energy storage buffer capacitor configured to store the AC electrical energy.

The energy storage and AC/DC conversion circuitry may include a DC/DC converter configured to respond to the converted AC/DC electrical energy and provide converted DC/DC electrical energy at a designed DC voltage to power the at least one component for monitoring the rotary machinery.

The energy storage buffer may include an output energy storage buffer capacitor configured to respond to the converted DC/DC electrical energy, store the converted DC/DC electrical energy, and provide the converted DC/DC electrical energy to power the at least one component for monitoring the rotary machinery.

The system may include a switch arranged between the output energy storage buffer capacitor and the at least one component, configured to remain in an ON condition until the converted DC/DC electrical energy stored in the output energy storage buffer capacitor has a voltage that is less than a predefined threshold voltage of the at least one component, and configured to remain in an OFF condition after the voltage stored in the output energy storage buffer capacitor rises above the predefined threshold voltage of the at least one component.

BRIEF DESCRIPTION OF THE DRAWING

The drawing, which is not necessarily drawn to scale, includes the following Figures.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

In summary, since vibrations already exist as a sensing parameter, and there is a possibility of harvesting the power from these vibrations, by applying the technology set forth herein, one can eliminate the need of external power requirements for the vibration sensors and the associated microcontrollers/communication and other design elements which make up the condition monitoring module.

By way of example, the solution set forth herein may use a piezoelectric sensor, which converts mechanical energy in the form of vibrations/shocks into electrical energy. The power output that is provided by the sensor that is coupled via a mechanical clamping system, such that a properly clamped piezoelectric sensor is able to harvest and provide the required energy to the electronics or electronic circuit of the condition monitoring device.

Also, in the case of a higher demand of power from the electronics, multiple piezoelectric sensors can be stacked together, and their outputs can be combined to increase the power capacity.

The resonant frequency of the system may be configured to match the frequency response of the piezoelectric sensor, e.g., which may be 60 Hz in this particular case.

Figure 2:
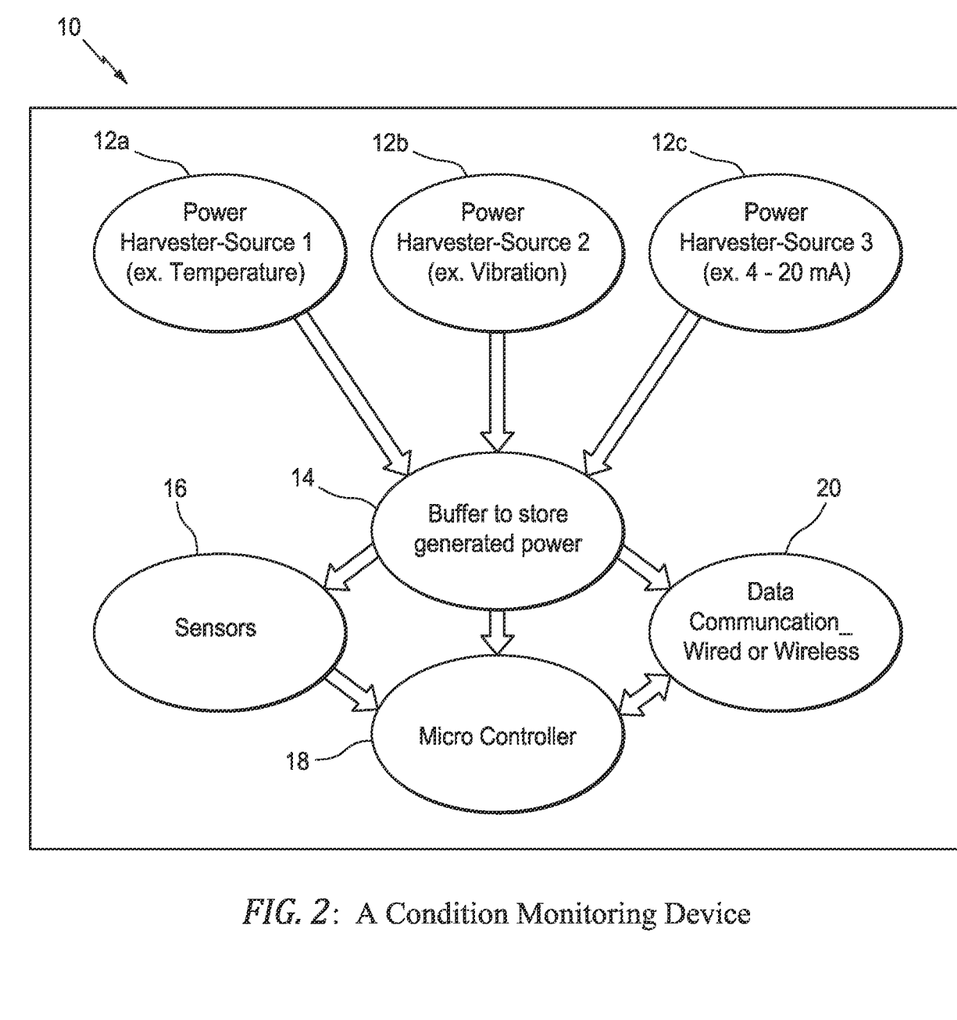
FIG. 2 is a block diagram of a condition monitoring device having power harvesting circuitry, e.g., including three power harvesters configured in relation to three condition monitoring sources or devices (e.g., temperature, vibration and a 4-20 mA), a buffer to store/convert generated power, and one or more sensors, a microcontroller, and a wired or wireless data communication module, according to some embodiments of the present invention.

By way of example, FIG. 2 shows a condition monitoring device generally indicated as 10 for power harvesting, e.g., having power harvesting circuitry (which includes three power harvesters 12a, 12b, 12c configured in relation to three sources (e.g., temperature, vibration and a 4-20 mA)), a buffer 14 to store/convert generated power, and sensors 16, a microcontroller 18, and a wired or wireless data communication module 20.

Figure 3:
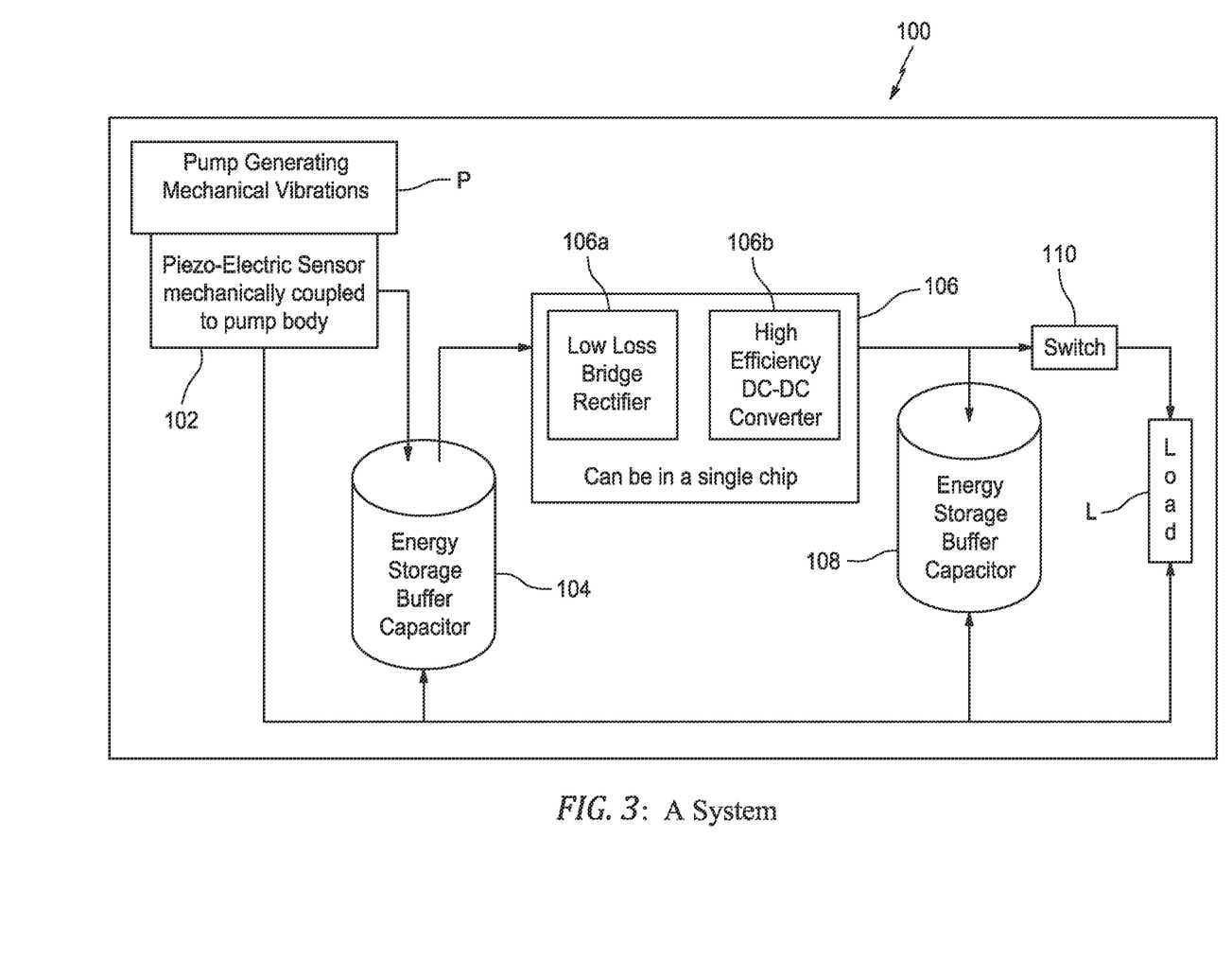
FIG. 3 is a block diagram of a system having power harvesting circuitry arranged in relation to a rotary machinery (e.g., like a pump) generating mechanical vibrations and a load (e.g., like one or more of the following: the buffer, the one or more sensors, a microcontroller, and a wired or wireless data communication module in FIG. 2), where the system includes a combination of a piezoelectric sensor mechanically coupled to the pump's body or housing, an input energy storage buffer capacitor, AC/DC conversion circuitry (e.g., having a bridge rectifier and a DC-DC converter), an output energy storage buffer capacitor, and a switch, according to some embodiments of the present invention.

FIG. 3 shows a system generally indicated as 100 having power harvesting circuitry arranged in relation to a rotary machinery (e.g., like a pump P) generating mechanical vibrations and a load L (e.g., like one or more of the following: the buffer 14, one or more sensors 16, a microcontroller 18, and a wired or wireless data communication module 20 in FIG. 2). The system 100 includes a combination of a piezoelectric sensor 102 mechanically coupled to a body or housing of the pump P, an input energy storage buffer capacitor 104, AC/DC conversion circuitry 106 having a bridge rectifier 106a and a DC-DC converter 106b, an output energy storage buffer capacitor 108, and a switch 110. By way of example, the AC/DC conversion circuitry 106 can be in a single chip, according to some embodiments.

In operation, the piezoelectric sensor 102 may be configured to generate the electrical signal based on the amplitude of the mechanical vibrations on the rotary machinery like the pump P. By way of example, this electrical signal may be an AC sinusoidal wave with a signal frequency based on the frequency of the pump's vibrations.

This AC signal may be fed to a power converter electronics circuit or circuitry 106, e.g., which has a low loss bridge rectifier 106a configured to convert the AC signal to a DC signal. The power converter electronics circuit or circuitry 106 also has a DC-DC converter 106b configured to regulate the output voltage at a designed voltage for powering the electronics of the condition monitoring device 10.

The input and output energy storage capacitors 104, 108 may be added at the input and output of the AC/DC power converter circuit or circuitry 106 and be configured to buffer the energy from the vibrations to the required voltage levels so that they can power up the desired load profile.

The system 100 may also include a switch or switching mechanism 110 configured or designed between the output of the buffer 108 and an input of the actual load L. This switch 110 may be configured to ensure that the peak demand of the load L does not dampen the input charge that is stored in the buffer capacitor 108. If this switch 110 is not used as designed, then as soon as the voltage level in the buffer capacitor 108 meets the operating voltage of the load L, the load L will turn ON and demand a peak energy from the buffer capacitor 108, which will reduce the voltage level stored in the buffer capacitor 108, and thus the load L will likely be switched OFF, e.g., until the energy level in the buffer capacitor 108 again reaches to the desired level, and this phenomenon may continue in an infinite loop.

In order to avoid this, the switch or switching mechanism 110 is configured to work as follows:

In operation, the switch 110 may be configured to remain in an OPEN condition until the voltage in the output storage buffer capacitor 108 is less than the defined threshold level.

Once the voltage in the output storage buffer capacitor 108 rises above the threshold level, then the switch 110 may be configured to turn to a CLOSED condition and provide the power to the load L to turn it ON. Now the load L is drawing the power from the output storage buffer capacitor 108, and the output storage buffer capacitor 108 is discharging to the load L.

The switch 110 may be configured to remain in the CLOSED condition until the voltage in the output storage buffer capacitor 108 drops below the lower threshold value, after which, the switch 110 may be configured to automatically turn to an OPEN condition, and the power to the load L is cut off.

Now, since there is no load for the output storage buffer capacitor 108, it starts to charge again based on the input energy from the vibrations of the rotary machinery.

This mechanism of automatically switching the power ON and OFF to the load L helps to optimize the storage capacitor value even for the smallest magnitude of the vibration at the input.

The output voltage from the AC/DC power converter circuit or circuitry 106 may be regulated to 3.3V which is the sufficient to drive the sensor or sensing circuit 16, the microcontroller 18, the low energy communication interface 20, which may be configured to transmit the condition monitoring data to upstream controllers/users directly.

In the system 100, the switch 110 may be configured as an automatic switch (e.g., a diode) that OPENS/CLOSES in response to a threshold voltage, or a suitable controller, e.g., such as the condition monitoring microcontroller 18 may be configured to provide suitable control signaling to control the switch 110.

The load L may include the power converter circuit 106, e.g., in embodiments where the power converter is implemented as a single chip having a bridge rectifier, a DC-DC converter and other electronics that need to be powered up.

The Circuits, Circuitry, Electronics and Components

Circuits, circuitry, electronics and components, e.g., like the one or more sensors, a microcontroller, a wired or wireless data communication module, a piezoelectric sensor, an input energy storage buffer capacitor, AC/DC conversion circuitry (e.g., having a low loss bridge rectifier and a high efficiency DC-DC converter), an output energy storage buffer capacitor, and a switch are known in the art, and the scope of the invention is not intended to be limited to any particular type or kind thereof either now known or later developed in the future.

Techniques for Mechanically Coupling

Techniques for mechanically coupling a piezoelectric sensor to a pump's body or housing are known in the art, and the scope of the invention is not intended to be limited to any particular type or kind thereof either now known or later developed in the future.

Power Harvesting Circuitry

By way of example, the power harvesting circuitry is disclosed herein as including, or taking the form of, a piezoelectric sensor. However, the scope of the invention is not intended to be limited to the same. For example, the scope of the invention is intended to include, and embodiments are envisioned implementing, the power harvesting circuitry in the form of another type or kind of sensors or circuitry either now known or later developed in the future, e.g., including but not limited to other types or kinds of transducers configured to respond to mechanical energy and transform the same into AC or DC electrical energy.

Possible Applications

A self-powered vibration monitoring module, e.g. having 3 axis vibration sensing and transmitting the data over a low energy Blue tooth interface.

A generic power harvesting module, e.g., that provides 3.3V/100 mA load with a defined switching frequency, this can be used to power up any load which needs to operate with a similar requirements.

A hybrid power generator, e.g., existing battery based solutions can be combined with the power harvested solution, so as to have the battery as a backup power and thus extending the life of battery.

The Scope of the Invention

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A system comprising:
a pump having a body or housing; and
a self-power condition monitoring device coupled to the body or housing of the pump, having one or more sensors arranged therein and configured to monitor one or more conditions of the pump, having one or more power harvesting circuitry, each power harvesting circuitry configured in relation to a respective one of the one or more sensors to respond to energy generated by the pump, and provide one or more harvested power, and having energy storage and conversion circuitry configured to respond to the one or more harvested power provided from the one or more power harvesting circuitry, and provide stored and converted power to the one or more sensors for monitoring the one or more conditions of the pump.

2. A system according to claim 1, where the power harvesting circuitry comprises one or more piezoelectric sensors configured to respond to mechanical energy from a vibration generated in one or more axes by the pump, and provide the harvested power as electrical energy.

3. A system according to claim 2, wherein
the electrical energy is AC electrical energy; and
the energy storage and conversion circuitry comprises an input energy storage buffer capacitor configured to respond to the AC electrical energy, and provide stored input AC electrical energy for AC/DC energy conversion.

4. A system according to claim 3, wherein the energy storage and conversion circuitry comprises AC/DC converter circuitry configured to respond to the stored input AC electrical energy and provide DC electrical energy.

5. A system according to claim 4, wherein the energy storage and conversion circuitry comprises DC/DC converter circuitry configured to respond to the DC electrical energy and provide converted DC/DC electrical energy at a designed DC voltage to power the at least one component.

6. A system according to claim 5, wherein the energy storage and conversion circuitry comprises an output energy storage buffer capacitor configured to respond to the converted DC/DC electrical energy, and provide stored converted DC/DC electrical energy to power the one or more sensors.

7. A system according to claim 1, wherein the system comprises a switch arranged between an output energy storage buffer capacitor of the energy storage and conversion circuitry and at least one load, configured to remain in an ON condition until the stored and converted power has a voltage that is less than a predefined threshold voltage of the at least one load; and configured to remain in an OFF condition after the voltage stored in the output energy storage buffer capacitor rises above the predefined threshold voltage of the at least one load.

8. A system according to claim 2, wherein the at least one piezoelectric sensor comprises multiple piezoelectric sensors stacked together.

9. A system according to claim 1, wherein the power harvesting circuitry is configured to couple mechanically to the body or housing of the pump.

10. A system according to claim 2, wherein the one or more piezoelectric sensors is configured to respond to mechanical vibration produced by the pump and provide a piezoelectric sensor electrical signal containing information about the amplitude of mechanical vibrations sensed.

11. A system according to claim 1, wherein the one or more power harvesting circuitry comprises one or more piezoelectric sensors configured to respond to thermal energy from a temperature generated by the pump, and provide the harvested power as electrical energy.

12. A system according to claim 1, wherein the the one or more sensors comprises a temperature sensor, or a vibration sensor or both the temperature sensor and the vibration sensor.

13. A self-powered condition monitoring device for arranging on a body or housing of a pump for monitoring at least one condition of the pump, comprising:
one or more sensors configured to monitor one or more conditions of the pump;
one or more power harvesting circuitry, each power harvesting circuitry configured in relation to a respective one of the one or more sensors respond to enemy generated by the pump, and provide one or more harvested power; and
energy storage and conversion circuitry configured to respond to the one or more harvested power provided from the one or more power harvesting circuitry, and provide stored and converted power to the one or more sensors for monitoring least one or more conditions of the pump.

14. A condition monitoring system according to claim 13, wherein the condition monitoring device comprises
one or more piezoelectric sensor configured to respond to mechanical enemy generated by the pump, and provide AC electrical energy; and
energy storage and AC/DC conversion circuitry configured to respond to the AC electrical enemy, and provide DC electrical energy to power the one or more sensors for monitoring of the pump, the energy storage and AC/DC conversion circuitry having:
an input energy storage buffer configured to respond to the AC electrical energy, store the AC electrical energy, and provide stored input AC electrical energy; and
an AC/DC bridge rectifier circuit configured to respond to the stored input AC electrical energy and provide converted AC/DC electrical energy to power the at least one sensor for monitoring the pump.

15. A condition monitoring system according to claim 14, wherein the input energy storage buffer comprises an energy storage buffer capacitor configured to store the AC electrical energy.

16. A condition monitoring system according to claim 14, wherein the energy storage and AC/DC conversion circuitry comprises a DC/DC converter configured to respond to the converted AC/DC electrical energy and provide converted DC/DC electrical energy at a designed DC voltage to power the one or more sensors for monitoring the pump.

17. A condition monitoring system according to claim 16, wherein the energy storage buffer comprises an output energy storage buffer capacitor configured to respond to the converted DC/DC electrical energy, store the converted DC/DC electrical energy, and provide the converted DC/DC electrical energy to power the one or more sensors for monitoring the pump.

18. A condition monitoring system according to claim 17, wherein the system comprises a switch arranged between the output energy storage buffer capacitor and at least one load, configured to remain in an ON condition until the converted DC/DC electrical energy stored in the output energy storage buffer capacitor has a voltage that is less than a predefined threshold voltage of the at least one load, and configured to remain in an OFF condition after the voltage stored in the output energy storage buffer capacitor rises above the predefined threshold voltage of the at least one load.

19. A condition monitoring system according to claim 14, wherein the one or more piezoelectric sensors comprises multiple piezoelectric sensors stacked together.

20. A system according to claim 1, wherein the one or more power harvesting circuitry is configured to respond to energy generated by the pump that includes signals related to sensing vibration or temperature.

21. A system according to claim 1, wherein the one or more power harvesting circuitry is configured to provide the enemy to one or more other components of the condition monitoring device, including a controller, or a wired or wireless data communication device, or some combination thereof.

* * * * *

UNITED STATES PATENT AND TRADEMARK OFFICE
CERTIFICATE OF CORRECTION

Page 1 of 1

PATENT NO.        : 11,209,007 B2
APPLICATION NO.   : 16/141210
DATED             : December 28, 2021
INVENTOR(S)       : Florin Rosca et al.

It is certified that error appears in the above-identified patent and that said Letters Patent is hereby corrected as shown below:

In the Claims

At Column 10, Line 51, Claim 13, Line 8, please delete the word "enemy" and insert the word --energy--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*